United States Patent
Hiskens et al.

(10) Patent No.: US 10,419,139 B2
(45) Date of Patent: Sep. 17, 2019

(54) VEHICLE CAMERA SIGNAL STRENGTH INDICATOR

(71) Applicant: Ford Global Technologies, LLC, Dearborn, MI (US)

(72) Inventors: David Hiskens, Ann Arbor, MI (US); Cynthia M. Neubecker, Westland, MI (US); Brad Ignaczak, Canton, MI (US); Somak Datta Gupta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/800,924

(22) Filed: Nov. 1, 2017

(65) Prior Publication Data
US 2019/0132067 A1    May 2, 2019

(51) Int. Cl.
| | |
|---|---|
| *H04B 17/318* | (2015.01) |
| *H04L 12/26* | (2006.01) |
| *H04N 7/18* | (2006.01) |
| *G08B 7/06* | (2006.01) |
| *H04N 1/00* | (2006.01) |

(52) U.S. Cl.
CPC ....... *H04B 17/318* (2015.01); *H04L 43/0823* (2013.01); *H04N 7/185* (2013.01); *G08B 7/06* (2013.01); *H04N 1/00103* (2013.01)

(58) Field of Classification Search
CPC .. H04B 17/318; H04N 7/185; H04N 1/00103; H04L 43/0823; G08B 7/06
See application file for complete search history.

(56) References Cited

U.S. PATENT DOCUMENTS

| | | | | |
|---|---|---|---|---|
| 2003/0100279 A1* | 5/2003 | Medvid | ............... | H03G 3/3052 455/164.2 |
| 2006/0141936 A1* | 6/2006 | Auffret | ............... | H04B 7/0805 455/67.11 |
| 2010/0027434 A1* | 2/2010 | Chung | ............... | H04L 41/5009 370/252 |
| 2013/0143576 A1 | 6/2013 | Kurz | | |
| 2016/0360353 A1 | 12/2016 | Brenner et al. | | |
| 2017/0039424 A1* | 2/2017 | Nerayoff | ............... | G06Q 20/145 |
| 2017/0062908 A1* | 3/2017 | Sanderovich | ........ | H01Q 21/065 |

(Continued)

FOREIGN PATENT DOCUMENTS

| | | |
|---|---|---|
| CN | 104954968 A | 9/2015 |
| KR | 20160031409 A | 3/1916 |
| WO | WO 2015187501 A1 | 12/2015 |

*Primary Examiner* — Brian D Nguyen
(74) *Attorney, Agent, or Firm* — Frank Lollo; Neal, Gerber & Eisenberg LLP; James P. Muraff

(57) ABSTRACT

Method and apparatus are disclosed for vehicle camera signal strength indicator. An example vehicle includes a first communication module, a second communication module, and a hardware module with a processor and memory. The first communication module communicatively couples to a wireless camera. The second communication module communicatively couples to a mobile device. The second communication module is different than the first communication module. The hardware module (i) determines a metric of transmission quality based on a signal strength from the wireless camera, and (ii) sends the metric of transmission quality to the mobile device to provide feedback regarding a placement of the wireless camera on the vehicle.

16 Claims, 3 Drawing Sheets

(56) References Cited

U.S. PATENT DOCUMENTS

| | | | |
|---|---|---|---|
| 2017/0075701 A1* | 3/2017 | Ricci | H04W 4/21 |
| 2017/0106834 A1 | 4/2017 | Williams et al. | |
| 2017/0109715 A1* | 4/2017 | Aguirre | G06Q 20/0652 |
| 2018/0129204 A1* | 5/2018 | Ricci | B60R 25/2018 |

* cited by examiner

VEHICLE CAMERA SIGNAL STRENGTH INDICATOR

TECHNICAL FIELD

The present disclosure generally relates to cameras attached to a vehicle and, more specifically, a vehicle camera signal strength indicator.

BACKGROUND

Wireless cameras are becoming increasingly prevalent in automotive applications. These wireless cameras assist in backing up a trailer, monitoring cargo in a trailer or other enclosed region, and assisting in off-road maneuvers. Because these cameras connect to the vehicle wirelessly instead of a hard-wired connection, the cameras need to be placed in a location where the signal between the camera and the antenna of the vehicle is sufficiently strong to transmit video. Adjusting the camera without convenient feedback is irritating. The driver must place the camera and then move to the cabin of the vehicle to determine whether the camera is operation at the placed location. In some scenarios, when there is no signal strength indicator on the provided by an infotainment system, the user does not know whether the sign will signal drop out in the middle of a difficult maneuver.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle camera signal strength indicator. An example vehicle includes a first communication module, a second communication module, and a hardware module with a processor and memory. The first communication module communicatively couples to a wireless camera. The second communication module communicatively couples to a mobile device. The second communication module is different than the first communication module. The hardware module (i) determines a metric of transmission quality based on a signal strength from the wireless camera, and (ii) sends the metric of transmission quality to the mobile device to provide feedback regarding a placement of the wireless camera on the vehicle.

An example system includes a wireless camera attachable to different positions on a vehicle. The example system also includes a mobile device that provides feedback to a user regarding a current position of the wireless camera based on a metric of transmission quality received from a vehicle. Additionally, the vehicle (i) communicatively couples to the wireless camera via a first communication module, (ii) communicatively couples to a mobile device via a second communication module different than the first communication module; (iii) determines a metric of transmission quality based on a signal strength from the wireless camera, and (iv) sends the metric of transmission quality to the mobile device based on the signal strength.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
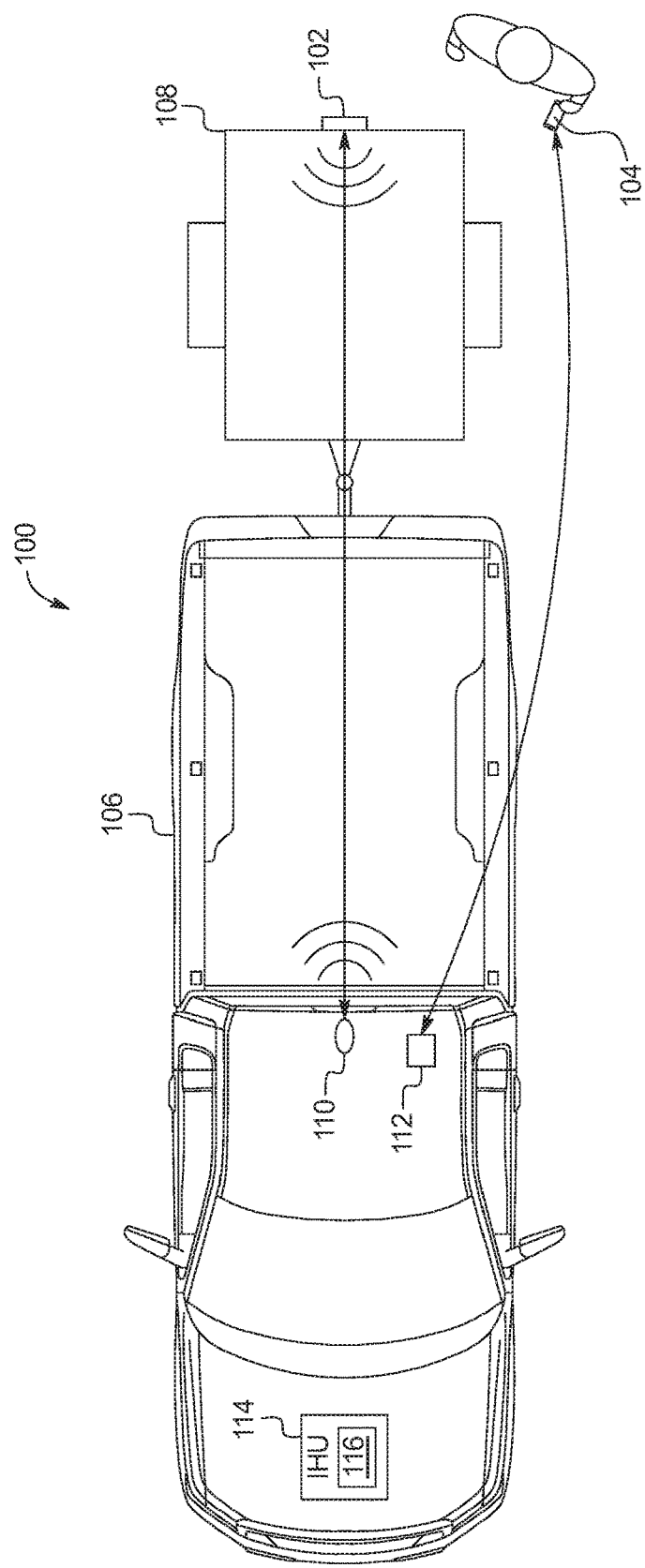
FIG. 1 illustrates a system operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Wireless cameras for mounting on a vehicle can be convenient because a driver does not need to modify the vehicle to operate the camera. Wireless cameras are communicatively connected to the vehicle through the wireless communication module (e.g., a Bluetooth Module®, a wireless local area network module, etc.) of the vehicle. To operate, the signal strength between the wireless camera and the wireless communication module is sufficient enough to provide bandwidth enough to transmit video from the camera to the wireless communication module. The signal strength depends on the path between the wireless communication module and the camera dictated by the placement of the camera. The signal strength can vary from location to location on a vehicle, for example, because the signal experiences different interference in different locations. As an example, the signal strength can vary from location to location when placing the wireless camera on a trailer to capture images behind the trailer (e.g., in lieu of the review camera that is blocked by the trailer, etc.). As another example, the metal body of the vehicle may cause varying levels of interference when the camera is placed on a side of the vehicle to record vehicle maneuvers. Traditionally, a signal strength between the wireless communication module and the wireless camera is displayed on the infotainment system. However, in that scenario, to check whether the camera is in a location in which the signal strength is sufficient, the driver must position the camera, return to the vehicle cabin to check the signal strength, and then repeat the steps until the placement is correct. In some scenarios, the infotainment system does not provide a signal strength indicator so the driver positions the camera not knowing if the signal between the wireless communication module and the camera is sufficient to transmit video during maneuvers.

As discussed below, the vehicle provides the signal strength indicator to an application executing on a mobile device (e.g., a smartphone, a smart watch, etc.). A wireless communication module vehicle pairs with the wireless camera using a process as indicated in the wireless protocol used by both the vehicle and the wireless camera. The vehicle and the wireless camera communicate using Wi-Fi®, Bluetooth®, Bluetooth® Low Energy, Z-Wave®, Zigbee®, and/or any wireless local area network protocol (e.g.,) etc. The vehicle and the mobile device of the driver pair using the process as indicated in the wireless protocol used by both the vehicle and the mobile device using a different wireless communication module. The vehicle determines the signal strength between the camera and the vehicle. In some example, the signal strength is included in messages exchanged by the vehicle and the camera. The signal strength may be communicated as a received signal strength indicator (RSSI), a transmission strength (RX), or a received channel power indicator (RCPI).

The vehicle determines whether the signal strength is sufficient to operate by using a metric indicative of transmission quality. In some examples, the vehicle compares the power ratio represented by the signal strength to a signal strength threshold. In some such example, the signal strength threshold is an amount (e.g., 20 decibel-milliwatts (dBm), etc.) above a minimum signal strength to transmit video (e.g., −92 dBm). For example, the signal strength threshold may be −72 dBm. Alternatively or additionally, in some examples, the vehicle may analyze the packet transmission data (e.g., packet error rate (PER), bit error rate (BER), etc.) of the transmissions from the camera. For example, the transmission quality may be sufficient when the PER is less than $5 \times 10^{-4}$.

The vehicle transmits an indicator of the transmission quality to the mobile device. In some examples, the indicator of the transmission quality is one of multiple predetermined categories to that describe the transmission quality. For example, the indicator of the transmission quality may be a number corresponding to a scale, where each number represents a subjective descriptor of a measure of quality (e.g., "excellent," "good," "satisfactory," "poor," and "very poor," etc.). In some examples, the vehicle also transmits the video being received via the other wireless communication module to the mobile device.

FIG. 1 illustrates a system 100 operating in accordance with the teachings of this disclosure. In the illustrated example, the system includes a wireless camera 102, a mobile device 104 (e.g., a smart phone, a smart watch, etc.), a vehicle 106, and a trailer 108. The wireless camera 102 is a camera that captures video images to be displayed on a display of the vehicle 106. In some examples, the wireless camera 102 includes a microphone to capture sound. Additionally, in some example, the wireless camera 102 may include infrared light emitting diodes (LEDs) to facilitate capturing images when the area around the vehicle 106 is dark. The wireless camera 102 includes a mount to physically couple the wireless camera 102 onto different locations on the trailer 108. The mobile device 104 is any electronic device that is capable of (a) communicatively coupling to the vehicle 106 with a wireless connection, and (b) providing visual, audible and/or haptic feedback based on messages received from the vehicle 106. For example, the mobile device 104 may be a smart phone executing a vehicle interface application (such as Fordpass®, etc.).

The vehicle 106 may be a standard gasoline powered vehicle, a hybrid vehicle, an electric vehicle, a fuel cell vehicle, and/or any other mobility implement type of vehicle. The vehicle 106 includes parts related to mobility, such as a powertrain with an engine, a transmission, a suspension, a driveshaft, and/or wheels, etc. The vehicle 106 may be non-autonomous, semi-autonomous (e.g., some routine motive functions controlled by the vehicle 106), or autonomous (e.g., motive functions are controlled by the vehicle 106 without direct driver input). In the illustrated example the vehicle 106 includes a first wireless communication module 110, and a second wireless communication module 112, and an infotainment head unit (IHU) 114.

The first and second wireless communication modules 110 and 112 includes hardware (e.g., processors, memory, storage, antenna, etc.) and software to control the wireless network interfaces used to communicate with the wireless camera 102 and the mobile device 104. The first and second wireless communication modules 110 and 112 include one or more communication controllers for personal area networks (e.g., Wi-Fi®, Bluetooth®, Bluetooth® Low Energy, Zigbee®, Z-Wave®, etc.) and/or wireless local area networks (including IEEE 802.11 a/b/g/n/ac or others). The first and second wireless communication modules 110 and 112 determine the signal strength (e.g., in RSSI, RX, RCPI, etc.) of the signals between the first and second wireless communication modules 110 and 112 and the corresponding device (e.g., the wireless camera 102, etc.). In the illustrated example, the first and second wireless communication modules 110 and 112 are separate hardware modules. Alternatively, in some examples, the first and second wireless communication modules 110 and 112 are incorporated into the same structure while capable of simultaneously communicating with the wireless camera 102 and the mobile device 104.

The infotainment head unit 114 provides an interface between the vehicle 106 and a user. The infotainment head unit 114 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 114 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 114 displays the infotainment system on, for example, the center console display. In the illustrated example, the infotainment head unit 114 includes a connection monitor 116. While the illustrated example includes the connection monitor 116 as part of the infotainment head unit 114, in other examples, the connection monitor 116 may be incorporated into in a separate hardware module, such as a dedicated image processing module or a communication gateway module.

The connection monitor 116 monitors a signal strength between the wireless camera 102 and the first wireless communication module 110 to facilitate a user positioning the wireless camera without viewing the display of the infotainment head unit 114. The connection monitor 116 determines the signal strength between the wireless camera 102 and the first wireless communication module 110, and sends an indicator of the transmission quality to the mobile device 104. In some examples, the connection monitor 116 also sends the video received from the wireless camera 102 to the mobile device 104.

The connection monitor 116 determines whether the signal strength is sufficient to operate the wireless camera 102 by using one or more metrics indicative of transmission quality. In some examples, the connection monitor 116 compares a power ratio represented by the signal strength to a signal strength threshold. In some such example, the signal strength threshold is an amount (e.g., 20 dBm, etc.) above a minimum signal strength to maintain transmission of video. For example, the minimum signal strength to maintain transmission of video may be −92 dBm. In such examples, the signal strength threshold may be −72 dBm. Alternatively or additionally, in some examples, the connection monitor 116 analyzes the packet transmission data (e.g., packet error rate (PER), bit error rate (BER), etc.) of the transmissions from the camera. In such examples, the connection monitor 116 compares the PER/BER to an error rate threshold. For example, error rate threshold may be $5\times10^4$.

The metric(s) of transmission quality are based on (i) the comparison of the signal strength to the signal strength threshold and/or (ii) the comparison of the PER/BER to the error rate threshold. In some examples, the connection monitor 116 determines the indicator of the transmission quality using one of multiple predetermined categories to that quantifiably describe or subjectively describe the transmission quality. For example, the indicator of the transmission quality may be a number corresponding to a scale, where each number represents a subjective descriptor of a measure of quality (e.g., "excellent," "good," "satisfactory," "poor," and "very poor," etc.). The connection monitor 116 categories the signal quality with reference to the corresponding threshold. For example, each category may represent a number of dBm away from the signal strength threshold. For example, a first category may be for signal strengths that are below the signal strength threshold, a second category may be for signal strengths that are between the signal strength threshold and 5 dBm above the threshold, and a third category may be for signal strengths that are more than 5 dBm above the threshold. As another example, each category may represent a frequency of packet errors or bit errors. For example, a first category may be for a frequency of packet errors or bit errors that are above the error rate threshold, a second category may be for a frequency of packet errors or bit errors that are between the error rate threshold and $2\times10^{-4}$ below the threshold, and a third category may be for signal strengths that are less than $2\times10^{-4}$ below the threshold. Via the second wireless communication module 112, the connection monitor 116 transmits the metric(s) of transmission quality to the mobile device 104. In some examples, the connection monitor 116 also sends the signal strength to the mobile device 104.

Figure 2:
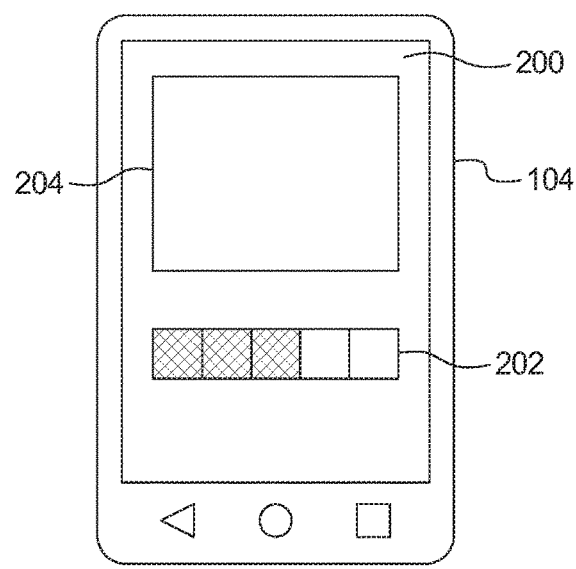
FIG. 2 illustrates an example interface on a mobile device.

FIG. 2 illustrates an example interface 200 on the mobile devices 104 to communicate the metric(s) of transmission quality. In the illustrated example, the interface 200 includes a visual representation 202 of the metric(s) of transmission quality. For example, the visual representation 202 may be segmented chart where each segment represents the metric(s) of transmission quality (e.g., a segment for each of the categories associated with the metric(s) of transmission quality, etc.). Additionally, in some examples, the visual representation 202 is color coded such that greater categories of the metric(s) of transmission quality are associated with green and lesser categories metric(s) of transmission quality are associated with red. In such a manner, the user can intuitively understand the current category of the metric(s) of transmission quality with a glance. Additionally or alternatively, in some examples, the categories of the metric(s) of transmission quality are associated with a sound and/or a haptic pattern. For example, the categories representative of low signal strength may be associated with higher pitched noises and categories representative of high signal strength may be associated with lower pitched noises. As another example, the categories representative of low signal strength may be associated with less frequent vibration and categories representative of high signal strength may be associated with more frequent vibration. In such examples, the user may be able to determine when the signal strength is sufficient (e.g., at least meets the threshold) without looking at a screen of the mobile device 104. Additionally, in the illustrated example, the interface 200 includes a display 204 of the video being captured by the wireless camera 102 and being relayed by the connection monitor 116. In some examples, the interface 200 presents the display 204 of the video being captured by the wireless camera 102 with the visual representation 202 of the metric(s) of transmission quality overlaid on the display 204.

Figure 3:
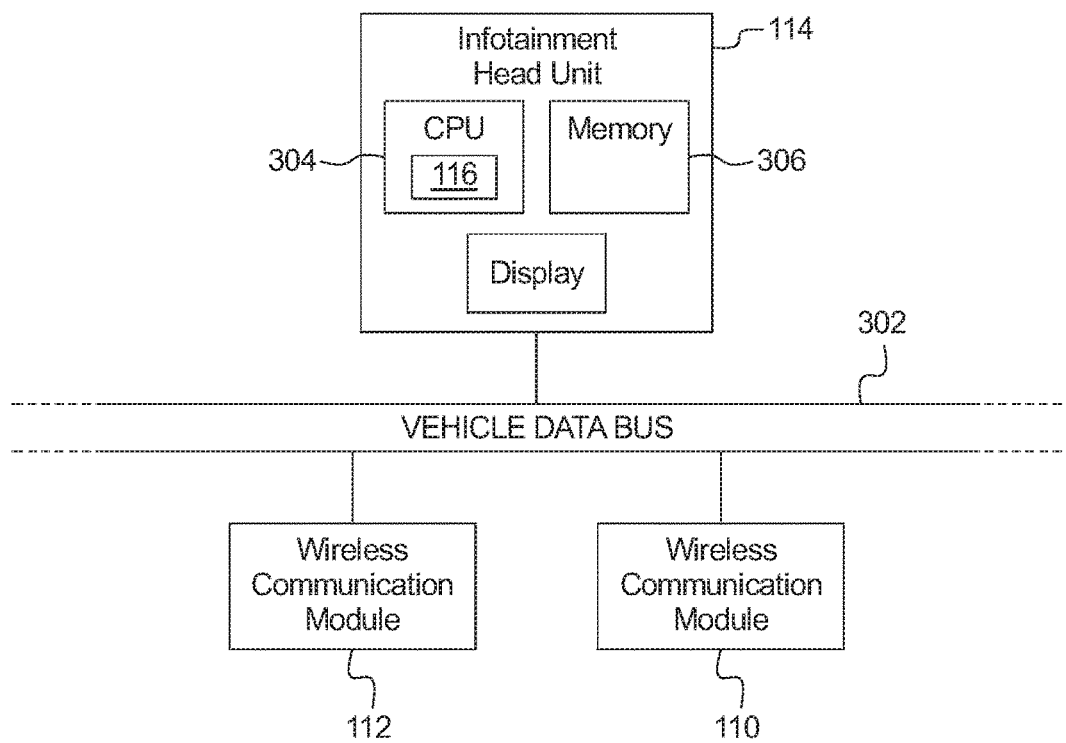
FIG. 3 is a block diagram of electronic components of the vehicle of FIG. 1.

FIG. 3 is a block diagram of electronic components 300 of the vehicle 106 of FIG. 1. In the illustrated example, the electronic components 300 includes the first and second wireless communication modules 110 and 112, the infotainment head unit 114, and a vehicle data bus 302.

The infotainment head unit 114 includes a processor or controller 304 and memory 306. In the illustrated example, the infotainment head unit 114 is structured to include the connection monitor 116. Alternatively, in some examples, the connection monitor 116 is incorporated into another hardware module (e.g., a dedicated image processing module, the communication gateway module, etc.) with a processor and memory. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the first and second wireless communication modules 110 and 112 and the infotainment head unit 114. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
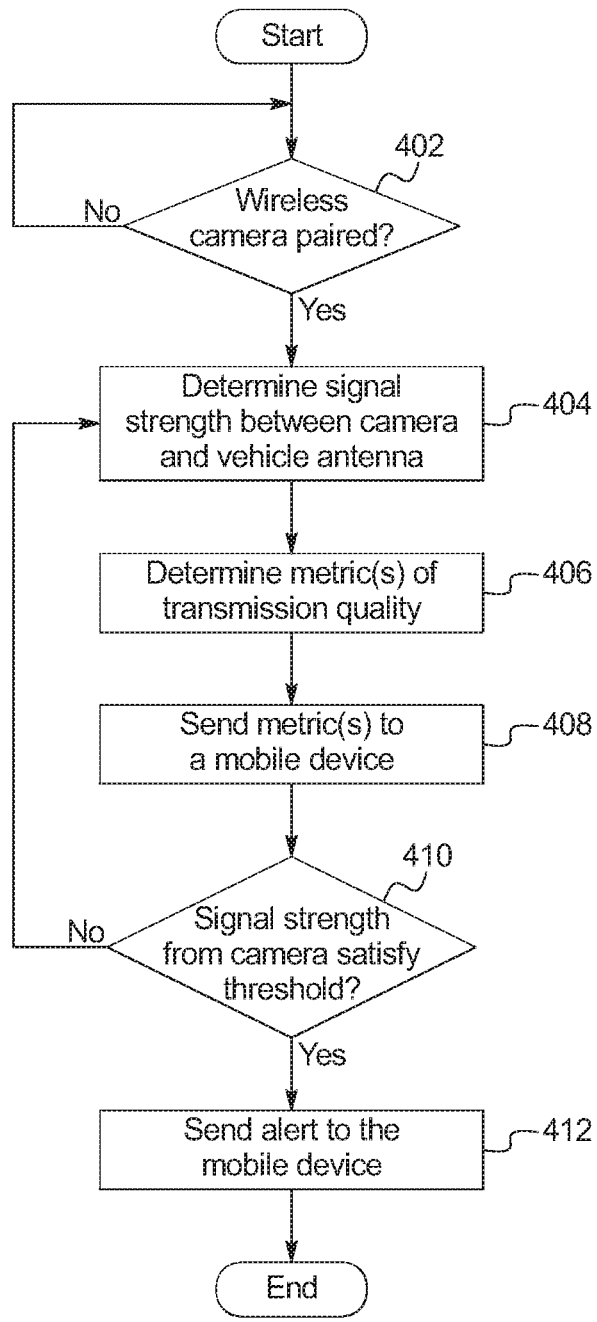
FIG. 4 is a flowchart of a method to provide a vehicle camera signal strength indicator on the mobile device of FIG. 2, which may be implemented by the electronic components of FIG. 3.

FIG. 4 is a flowchart of a method to provide a vehicle camera signal strength indicator on the mobile device 104 of FIGS. 1 and 2, which may be implemented by the electronic components 300 of FIG. 3. Initially, at block 402, the connection monitor 116 waits until a wireless camera 102 is paired with the first wireless communication module 110. At block 404, the connection monitor 116 determines the signal strength between the wireless camera 102 and the first wireless communication module 110. At block 406, the connection monitor 116 determines one or more metrics of transmission quality based on the signal strength. At block 408, the connection monitor 116 sends the metrics of transmission quality and, in some examples, the video from the wireless camera 102 to the mobile device 104 via the second wireless communication module 112. At block 410, the connection monitor 116 determines whether the signal strength from the wireless camera 102 satisfies the corresponding threshold (e.g., the signal strength threshold, the error rate threshold, etc.). When the signal strength satisfies the corresponding threshold, the method continues to block 412. Otherwise, when the signal strength from the wireless camera 102 does not satisfy the corresponding threshold, the method returns to block 404. At block 412, the connection monitor 116 sends an alert to the mobile device 104 to cause the mobile device 104 to provide an audible, visual, and/or haptic alert to the user.

The flowchart of FIG. 4 is representative of machine readable instructions stored in memory (such as the memory 306 of FIG. 3) that comprise one or more programs that, when executed by a processor (such as the processor 304 of FIG. 3), cause the infotainment head unit 114 to implement the example connection monitor 116 of FIGS. 1 and 3. Further, although the example program(s) is/are described with reference to the flowchart illustrated in FIG. 4, many other methods of implementing the example connection monitor 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an antenna;
a processor; and
memory storing instructions which, when executed by the processor, cause the processor to operate with the antenna to:
communicatively couple to a wireless camera and a mobile device separate from the wireless camera;
determine a metric of transmission quality based on a signal strength from the wireless camera; and
send the metric of transmission quality to the mobile device to provide feedback regarding a placement of the wireless camera on the vehicle.

2. The vehicle of claim 1, wherein to determine the metric of transmission quality, the instruction cause the processor to compare the signal strength to a threshold.

3. The vehicle of claim 2, wherein, to determine the metric of transmission quality, the instructions cause the processor to categorize the signal strength using categories indicative of subjective signal quality based on how close the signal strength is to the threshold.

4. The vehicle of claim 2, wherein the signal strength is one of a received signal strength indicator, a transmission strength, or a received channel power indicator.

5. The vehicle of claim 2, wherein the signal strength is one of a packet error rate or a bit error rate.

6. The vehicle of claim 1, wherein the instructions further cause the processor to operate with the antenna to:
compare the signal strength to a threshold; and
when the signal strength satisfies the threshold, send an alert to the mobile device to cause the mobile device to provide the alert to a user.

7. The vehicle of claim 1, wherein the instructions further cause the processor to operate with the antenna to transmit video received from the wireless camera to the mobile device to be displayed on the mobile device.

8. The vehicle of claim 1, wherein the metric of transmission quality causes the mobile device to display a visual indicator of signal quality based on a category of the metric of transmission quality.

9. The vehicle of claim 1, wherein the metric of transmission quality causes the mobile device to provide a sound, a pitch of the sound based on a category of the metric of transmission quality.

10. The vehicle of claim 1, wherein the metric of transmission quality causes the mobile device to provide a vibration, a frequency of the vibration based on a category of the metric of transmission quality.

11. A system comprising:
a wireless camera attachable to different positions on a vehicle; and
the vehicle comprising:
an antenna;
a processor; and
memory storing instructions which, when executed by the processor, cause the processor to operate with the antenna to:
communicatively couple to the wireless camera and a mobile device separate from the wireless camera;
determine a metric of transmission quality based on a signal strength from the wireless camera; and send the metric of transmission quality to the mobile device based on the signal strength; and the mobile device configured to provide feedback to a user regarding a current position of the wireless camera based on the metric of transmission quality received from the vehicle.

12. The system of claim 11, wherein the mobile device is further configured to display a visual indicator of signal quality based on a category of the metric of transmission quality.

13. The system of claim 11, wherein the mobile device is further configured to provide a sound, a pitch of the sound based on a category of the metric of transmission quality.

14. The system of claim 11, wherein the mobile device is further configured to provide a vibration, a frequency of the vibration based on a category of the metric of transmission quality.

15. The system of claim 11, wherein to determine the metric of transmission quality, the instructions cause the processor to categorize the signal strength using categories indicative of subjective signal quality based on how close the signal strength is to a threshold.

16. A method comprising;
communicatively coupling an antenna included in a vehicle, a wireless camera, and a mobile device separate from the wireless camera;
determining, via a processor included in the vehicle, a metric of transmission quality based on a signal strength from the wireless camera; and
sending, from the processor via the antenna, the metric of transmission quality to the mobile device to provide feedback regarding a placement of the wireless camera on the vehicle.

* * * * *